(12) United States Patent
Yamamoto et al.

(10) Patent No.: US 11,431,034 B2
(45) Date of Patent: Aug. 30, 2022

(54) HYDROXIDE ION CONDUCTIVE SEPARATOR AND ZINC SECONDARY BATTERY

(71) Applicant: NGK INSULATORS, LTD., Nagoya (JP)

(72) Inventors: Sho Yamamoto, Nagoya (JP); Naoko Inukai, Nagoya (JP); Shohei Yokoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/189,699

(22) Filed: Mar. 2, 2021

(65) Prior Publication Data

US 2021/0184268 A1   Jun. 17, 2021

Related U.S. Application Data

(63) Continuation of application No. PCT/JP2020/023057, filed on Jun. 11, 2020.

(30) Foreign Application Priority Data

Jun. 19, 2019 (JP) .............................. JP2019-113669

(51) Int. Cl.
*H01M 10/26* (2006.01)
*H01M 50/434* (2021.01)
*H01M 8/0236* (2016.01)
*H01M 8/0243* (2016.01)
*H01M 8/083* (2016.01)
*H01M 8/1246* (2016.01)

(52) U.S. Cl.
CPC ......... *H01M 10/26* (2013.01); *H01M 8/0236* (2013.01); *H01M 8/0243* (2013.01); *H01M 8/083* (2013.01); *H01M 8/1246* (2013.01); *H01M 50/434* (2021.01)

(58) Field of Classification Search
CPC .. H01M 10/26; H01M 50/434; H01M 8/0236; H01M 8/0243; H01M 8/083; H01M 8/1246
See application file for complete search history.

(56) References Cited

U.S. PATENT DOCUMENTS

| 9,293,791 B2 | 3/2016 | Yamada et al. |
| 10,290,847 B2 | 5/2019 | Kitoh et al. |

(Continued)

FOREIGN PATENT DOCUMENTS

| JP | 2018-058766 A1 | 4/2018 |
| JP | 2019-075379 A1 | 5/2019 |

(Continued)

OTHER PUBLICATIONS

International Search Report and Written Opinion (Application No. PCT/JP2020/023057) dated Sep. 8, 2020.

*Primary Examiner* — Karie O'Neill Apicella
(74) *Attorney, Agent, or Firm* — Burr & Brown, PLLC

(57) ABSTRACT

Provided is a hydroxide ion-conductive separator including a porous substrate and a layered double hydroxide (LDH)-like compound filling pores of the porous substrate, wherein the LDH-like compound is a hydroxide and/or an oxide with a layered crystal structure, containing: Mg; and one or more elements, which include at least Ti, selected from the group consisting of Ti, Y, and Al.

15 Claims, 9 Drawing Sheets

(56) References Cited

U.S. PATENT DOCUMENTS

2014/0315099 A1* 10/2014 Yamada ................ H01M 4/244
                                                            429/304
2017/0214019 A1    7/2017 Yokoyama et al.
2019/0126589 A1    5/2019 Yamamoto et al.

FOREIGN PATENT DOCUMENTS

| JP | 2019-079815 A1 | 5/2019 |
| WO | 2013/118561 A1 | 8/2013 |
| WO | 2016/067884 A1 | 5/2016 |
| WO | 2016/076047 A1 | 5/2016 |
| WO | 2017/221531 A1 | 12/2017 |
| WO | 2017/221989 A1 | 12/2017 |

* cited by examiner

HYDROXIDE ION CONDUCTIVE SEPARATOR AND ZINC SECONDARY BATTERY

CROSS-REFERENCE TO RELATED APPLICATIONS

This application is a continuation application of PCT/JP2020/023057 filed Jun. 11, 2020, which claims priority to Japanese Patent Application No. 2019-113669 filed Jun. 19, 2019, the entire contents all of which are incorporated herein by reference.

BACKGROUND OF THE INVENTION

1. Field of the Invention

The present invention relates to a hydroxide ion-conductive separator and a zinc secondary battery.

2. Description of the Related Art

It is known that, in zinc secondary batteries such as nickel zinc secondary batteries and air zinc secondary batteries, metallic zinc precipitates from the negative electrode in the form of dendrites during charging, penetrates the voids of a separator such as a non-woven fabric, and reaches the positive electrode, resulting in short circuits. Such short circuits caused by zinc dendrites shortens the repeated charge/discharge life.

To deal with the above problem, a battery with a layered double hydroxide (LDH) separator that selectively permeates hydroxide ions, while blocking the penetration of zinc dendrites has been proposed. A layered double hydroxide (LDH) is a substance that has exchangeable anions and $H_2O$ as an interlayer between stacked basic hydroxide layers. For example, Patent Literature 1 (WO2013/118561) discloses providing a LDH separator between a positive electrode and a negative electrode in a nickel zinc secondary battery. Further, Patent Literature 2 (WO2016/076047) discloses a separator structure including a LDH separator fitted or bonded to an outer frame made of resin, wherein the LDH separator has a high denseness so as to be impermeable to gases and/or water. Further, this literature also discloses that the LDH separator can be combined with a porous substrate. Further, Patent Literature 3 (WO2016/067884) discloses various methods for obtaining a composite material (LDH separator) by forming a LDH dense membrane on a surface of a porous substrate. Such a method comprises a step of forming a LDH dense membrane on a surface of a porous substrate by uniformly attaching a starting substance that can give a starting point for LDH crystal growth to the porous substrate and hydrothermally treating the porous substrate in an aqueous solution of raw materials. The LDHs disclosed in EXAMPLES of Patent Literatures 1 to 3 are all Mg—Al LDHs in which the basic hydroxide layers contain Mg and Al.

Meanwhile, Patent Literature 4 (WO2017/221989) discloses a LDH-containing function layer and a composite material (that is, LDH separator), including a LDH composed of: a plurality of basic hydroxide layers containing Ni, Al, and Ti, and OH groups; and an interlayer interposed between the plurality of basic hydroxide layers and composed of anions and $H_2O$. Further, Patent Literature 5 (WO2017/221531) discloses a LDH-containing function layer and a composite material (that is, LDH separator), including a LDH composed of: a plurality of basic hydroxide layers composed of Ni, Ti, and OH groups; and an interlayer interposed between the plurality of basic hydroxide layers and composed of anions and $H_2O$.

CITATION LIST

Patent Literature

Patent Literature 1: WO2013/118561
Patent Literature 2: WO2016/076047
Patent Literature 3: WO2016/067884
Patent Literature 4: WO2017/221989
Patent Literature 5: WO2017/221531

SUMMARY OF THE INVENTION

When a zinc secondary battery such as a nickel zinc battery is composed using such a LDH separator as described above, short circuits or the like due to zinc dendrites can be prevented to some extent. However, the effect of preventing dendrite short circuits is desired to be further improved. Further, high hydroxide ion conductivity is required for electrolytic solutions of alkali secondary batteries (such as metal air batteries and nickel zinc batteries) to which such a LDH is applied, and therefore use of strongly alkaline potassium hydroxide aqueous solutions with a pH of about 14 is desired. Therefore, LDHs are desired to have a high level of alkali resistance that allows almost no deterioration even in such strongly alkaline electrolytic solutions.

The inventors have now found that a hydroxide ion-conductive separator having excellent alkali resistance and capable of suppressing short circuits due to zinc dendrites further effectively can be provided by using a LDH-like compound that is a hydroxide and/or an oxide with a layered crystal structure containing at least Mg and Ti as a hydroxide ion-conductive substance instead of conventional LDHs.

Accordingly, an object of the present invention is to provide a hydroxide ion-conductive separator having excellent alkali resistance and capable of suppressing short circuits due to zinc dendrites further effectively.

According to an aspect of the present invention, there is provided a hydroxide ion-conductive separator comprising:
  a porous substrate; and
  a layered double hydroxide (LDH)-like compound filling pores of the porous substrate, wherein the LDH-like compound is a hydroxide and/or an oxide with a layered crystal structure, containing: Mg; and one or more elements, which include at least Ti, selected from the group consisting of Ti, Y, and Al.

According to another aspect of the present invention, there is provided a zinc secondary battery comprising the hydroxide ion-conductive separator.

According to another aspect of the present invention, there is provided a solid alkaline fuel cell comprising the hydroxide ion-conductive separator.

EMBODIMENTS OF INVENTION

Hydroxide Ion-Conductive Separator

Figure 1:
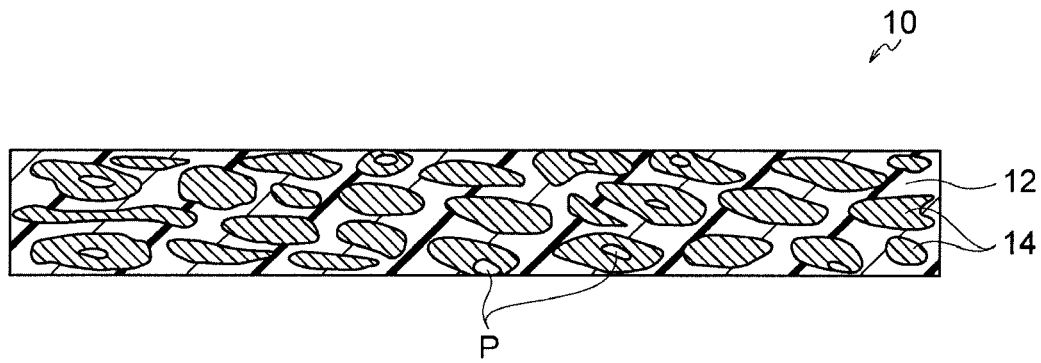
FIG. 1 is a schematic sectional view conceptually showing the hydroxide ion-conductive separator of the present invention.

As the schematic sectional view is conceptually shown in FIG. 1, a hydroxide ion-conductive separator 10 of the present invention comprises a porous substrate 12 and a layered double hydroxide (LDH)-like compound 14. In this description, the "hydroxide ion-conductive separator" is defined as a separator containing a hydroxide ion-conductive material (which is herein a LDH-like compound) and configured to selectively pass hydroxide ions exclusively by means of the hydroxide ion conductivity of the hydroxide ion-conductive material or the LDH-like compound. In FIG. 1, the region of the LDH-like compound 14 is drawn as if it is not continuous between the upper surface and the lower surface of the hydroxide ion-conductive separator 10, but this is because the figure is drawn two-dimensionally as a cross section. When the depth is considered three-dimensionally, the region of the LDH-like compound 14 is continuous between the upper surface and the lower surface of the hydroxide ion-conductive separator 10, thereby ensuring the hydroxide ion conductivity of the hydroxide ion-conductive separator 10. In the hydroxide ion-conductive separator 10, the pores of the porous substrate 12 are filled with the LDH-like compound 14. However, the pores of the porous substrate 12 are not necessarily completely filled, and residual pores P may be slightly present. The LDH-like compound 14 is a hydroxide and/or an oxide with a layered crystal structure similar to LDH, though it cannot be called LDH, and contains: Mg; and one or more elements, which include at least Ti, selected from the group consisting of Ti, Y, and Al. In this way, a hydroxide ion-conductive separator having excellent alkali resistance and capable of suppressing short circuits due to zinc dendrites further effectively can be provided by using a LDH-like compound that is a hydroxide and/or an oxide with a layered crystal structure containing at least Mg and Ti as a hydroxide ion-conductive substance instead of conventional LDHs.

As described above, the LDH-like compound 14 is a hydroxide and/or an oxide with a layered crystal structure containing: Mg; and one or more elements, which include at least Ti, selected from the group consisting of Ti, Y, and Al. Accordingly, the LDH-like compound 14 is typically a composite hydroxide and/or a composite oxide of Mg, Ti, optionally Y, and optionally Al. The aforementioned elements may be replaced with other elements or ions to the extent that the basic properties of the LDH-like compound 14 are not impaired, but the LDH-like compound 14 is preferably free from Ni. For example, the LDH-like compound 14 may further contain Zn and/or K. This can further improve the ion conductivity of the hydroxide ion-conductive separator 10.

The LDH-like compound 14 can be identified by X-ray diffraction. Specifically, the hydroxide ion-conductive separator 10 has a peak that is derived from the LDH-like compound and detected in the range of typically $5°≤2θ≤10°$, more typically $7°≤2θ≤10°$, when X-ray diffraction is performed on its surface. As described above, a LDH is a substance having an alternating laminated structure in which exchangeable anions and $H_2O$ are present as an interlayer between stacked basic hydroxide layers. In this regard, when the LDH is measured by X-ray diffraction, a peak due to the crystal structure of the LDH (that is, the (003) peak of LDH) is originally detected at a position of $2θ=11°$ to $12°$. In contrast, when the LDH-like compound 14 is measured by X-ray diffraction, a peak is typically detected in such a range shifted toward the low angle side from the peak position of the LDH. Further, the interlayer distance in the layered crystal structure can be determined by Bragg's equation using $2θ$ corresponding to peaks derived from the LDH-like compound in X-ray diffraction. The interlayer distance in the layered crystal structure constituting the LDH-like compound 14 thus determined is typically 0.883 to 1.8 nm, more typically 0.883 to 1.3 nm.

The hydroxide ion-conductive separator 10 preferably has an atomic ratio Mg/(Mg+Ti+Y+Al) in the LDH-like compound 14, as determined by energy dispersive X-ray spectroscopy (EDS), of 0.03 to 0.25, more preferably 0.05 to 0.2. Further, an atomic ratio Ti/(Mg+Ti+Y+Al) in the LDH-like compound 14 is preferably 0.40 to 0.97, more preferably 0.47 to 0.94. Further, an atomic ratio Y/(Mg+Ti+Y+Al) in the LDH-like compound 14 is preferably 0 to 0.45, more preferably 0 to 0.37. Further, an atomic ratio Al/(Mg+Ti+Y+Al) in the LDH-like compound 14 is preferably 0 to 0.05, more preferably 0 to 0.03. Within such a range, the alkali resistance is further excellent, and the effect of suppressing short circuits due to zinc dendrites (that is, dendrite resistance) can be achieved more effectively. Meanwhile, LDHs conventionally known for LDH separators can be expressed by a basic composition represented by the formula: $M^{2+}_{1-x}M^{3+}_x(OH)_2A^{n-}_{x/n} \cdot mH_2O$ (in the formula, $M^{2+}$ is a divalent cation, $M^{3+}$ is a trivalent cation, $A^{n-}$ is an n-valent anion, n is an integer of 1 or more, x is 0.1 to 0.4, and m is 0 or more). In contrast, the aforementioned atomic ratios in the LDH-like compound 14 generally deviate from those in the aforementioned formula of LDH. Therefore, it can be said that the LDH-like compound 14 in the present invention generally has composition ratios (atomic ratios) different from those of such a conventional LDH. The EDS analysis is preferably performed by 1) capturing an image at an acceleration voltage of 20 kV and a magnification of 5,000 times, 2) performing analysis at three points at intervals of about 5 μm in the point analysis mode, 3) repeating procedures 1) and 2) above once again, and 4) calculating an average of the six points in total, using an EDS analyzer (for example, X-act, manufactured by Oxford Instruments).

The hydroxide ion-conductive separator 10 preferably has an ion conductivity of 0.1 mS/cm or more, more preferably 1.0 mS/cm or more, further preferably 1.5 mS/cm or more, particularly preferably 2.0 mS/cm or more. Within such a range, sufficient functions as a hydroxide ion-conductive separator can be exerted. Since a higher ion conductivity is better, the upper limit is not specifically limited, but it is, for example, 10 mS/cm. The ion conductivity is calculated based on the resistance of the hydroxide ion-conductive separator and the thickness and area of the hydroxide ion-conductive separator. The resistance of the hydroxide ion-conductive separator 10 can be determined by measuring the hydroxide ion-conductive separator 10 immersed in a KOH aqueous solution at a predetermined concentration (for example, 5.4 M) with an electrochemical measurement system (potentiostat/galvanostat-frequency response analyzer) at a frequency range of 1 MHz to 0.1 Hz and an applied voltage of 10 mV, to determine the real axis intercept as the resistance of the hydroxide ion-conductive separator.

The hydroxide ion-conductive separator 10 is a separator containing the layered double hydroxide (LDH)-like compound 14 and, when incorporated in a zinc secondary battery, isolates between the positive electrode plate and the negative electrode plate so that hydroxide ions can be conducted. The hydroxide ion-conductive separator 10 is preferably impermeable to gases and/or water. In other words, the hydroxide ion-conductive separator 10 is preferably densified so as to be impermeable to gases and/or water. In this description, being "impermeable to gases" means that, even when helium gas is brought into contact with one surface of the measurement target in water at a differential pressure of 0.5 atm, bubbles due to the helium gas are not generated from the other surface, as described in Patent Literatures 2 and 3. Further, being "impermeable to water" in this description means that water in contact with one surface of the measurement target does not permeate to the other surface, as described in Patent Literatures 2 and 3. That is, the fact that the hydroxide ion-conductive separator 10 is impermeable to gases and/or water means that the hydroxide ion-conductive separator 10 has a high level of denseness so as not to allow gases or water to pass therethrough and means not to be a porous film or another porous material having permeability to water or gases. This enables the hydroxide ion-conductive separator 10 to selectively pass only hydroxide ions due to the hydroxide ion conductivity and to exhibit functions as a battery separator. Therefore, the configuration thereof is extremely effective for physically blocking the penetration through the separator by zinc dendrites formed during charging to prevent short circuits between the positive and negative electrodes. The hydroxide ion-conductive separator 10 having hydroxide ion conductivity enables efficient movement of necessary hydroxide ions between the positive electrode plate and the negative electrode plate, thereby enabling charge/discharge reactions in the positive electrode plate and the negative electrode plate to be achieved.

The hydroxide ion-conductive separator 10 preferably has a He permeability per unit area of 10 cm/min·atm or less, more preferably 5.0 cm/min·atm or less, further preferably 1.0 cm/min·atm or less. It can be said that the hydroxide ion-conductive separator 10 having a He permeability within such a range has extremely high denseness. Accordingly, a separator having a He permeability of 10 cm/min·atm or less can block the passage of substances other than hydroxide ions at a high level. For example, in the case of a zinc secondary battery, it can suppress Zn permeation (typically, permeation of zinc ions or zincate ions) extremely effectively in an electrolytic solution. The He permeability is measured by a step of supplying He gas to one surface of a separator to allow the He gas to permeate the separator and a step of calculating the He permeability to evaluate the denseness of the hydroxide ion-conductive separator. The He permeability is calculated by the formula of $F/(P \times S)$ using the amount F of He gas permeation per unit time, the differential pressure P applied to the separator when the He gas permeates therethrough, and the membrane area S through which the He gas permeates. Such evaluation of gas permeation using He gas enables evaluation of the presence or absence of denseness at an extremely high level. As a result, a high level of denseness that does not allow permeation of substances other than hydroxide ions (particularly, Zn that causes growth of zinc dendrites) as much as possible (allowing permeation of only a very small amount) can be effectively evaluated. This is because He gas has the smallest structural unit among various atoms or molecules that can constitute a gas and has extremely low reactivity. That is, He constitutes He gas by single He atoms without forming molecules. In this regard, since hydrogen gas is composed of $H_2$ molecules, the He atom alone is smaller as a gas structural unit. In the first place, $H_2$ gas is a flammable gas and thus is dangerous. Further, adopting an index that is the He gas permeability defined by the aforementioned formula enables objective evaluation of denseness to be performed conveniently, regardless of the difference in various sample sizes and measurement conditions. Thus, whether or not the separator has sufficiently high denseness suitable for a zinc secondary battery separator can be evaluated conveniently, safely, and effectively. The He permeability can be preferably measured according to the procedure shown in Evaluation 5 of EXAMPLES, which will be described below.

Even when immersed in a 5.4 M (mol/L) KOH aqueous solution containing zinc oxide at a concentration of 0.4 M (mol/L) at 90° C. for one week (that is, 168 hours), the hydroxide ion-conductive separator 10 preferably has a He permeability per unit area of 10 cm/min·atm or less, more preferably 5.0 cm/min·atm or less, further preferably 1.0 cm/min·atm or less. Within such a range, the separator can be regarded as undergoing almost no change in He permeability before and after immersion in alkali and therefore being extremely excellent in alkali resistance. In this regard, it is considered that an increase in He permeability after immersion in alkali can be effectively suppressed in the present invention by the LDH-like compound 14 containing: Mg; and one or more elements, which include at least Ti, selected from the group consisting of Ti, Y, and Al. It can be said that the immersion in a potassium hydroxide aqueous solution at a high temperature of 90° C. is a harsher alkali-resistance acceleration test than at a low temperature (for example, 30° C.).

As described above, the hydroxide ion-conductive separator 10 comprises the LDH-like compound 14 and the porous substrate 12 (typically, composed of the porous substrate 12 and the LDH-like compound 14), wherein the LDH-like compound is filling the pores of the porous substrate so that the hydroxide ion-conductive separator 10 has hydroxide ion conductivity and gas impermeability (hence, functions as a separator having hydroxide ion conductivity). It is particularly preferable that the LDH-like compound 14 is incorporated over the entire thickness direction of the porous substrate 12. The thickness of the hydroxide ion-conductive separator 10 is preferably 3 to 80 μm, more preferably 3 to 60 μm, further preferably 3 to 40 μm.

The porous substrate 12 is preferably composed of at least one selected from the group consisting of ceramic materials, metal materials, and polymer materials, more preferably at least one selected from the group consisting of ceramic materials and polymer materials. In this case, preferable examples of the ceramic materials include alumina, zirconia, titania, magnesia, spinel, calcia, cordierite, zeolite, mullite, ferrite, zinc oxide, silicon carbide, and any combination thereof, more preferably, alumina, zirconia, titania, and any combination thereof, particularly preferably alumina, zirconia (for example, yttria-stabilized zirconia (YSZ)), and a combination thereof. Use of these porous ceramics facilitates forming a hydroxide ion-conductive separator having excellent denseness. Preferable examples of the metal materials include aluminum, zinc, and nickel.

The porous substrate 12 is particularly preferably composed of polymer materials. A porous polymer substrate has advantages of 1) having flexibility (hence, being less likely to crack even with reduced thickness), 2) being easy to increase the porosity, 3) being easy to increase the conductivity (because the thickness can be reduced while the porosity is increased), and 4) being easy to manufacture and handle. Further, there is also an advantage that 5) the hydroxide ion-conductive separator containing the porous substrate made of a polymer material can be easily bent or sealed and bonded, using the aforementioned advantage of 1) having flexibility. Preferable examples of the polymer materials include polystyrene, polyether sulfone, polypropylene, epoxy resins, polyphenylene sulfide, fluorocarbon polymers (such as polytetrafluoroethylene: PTFE), cellulose, nylons, polyethylene, and any combination thereof. More preferably, polystyrene, polyether sulfone, polypropylene, epoxy resins, polyphenylene sulfide, fluorocarbon polymers (such as polytetrafluoroethylene: PTFE), nylons, polyethylene, and any combination thereof can be mentioned, as thermoplastic resins suitable for hot pressing. Such various preferable materials all have alkali resistance as a resistance to electrolytic solutions of batteries. Particularly preferable examples of the polymer materials include polyolefins such as polypropylene and polyethylene, most preferably polypropylene or polyethylene, since they are excellent in hot-water resistance, acid resistance, and alkali resistance and are low in cost. When the porous substrate 12 is composed of a polymer material, the LDH-like compound 14 is particularly preferably incorporated over the entire thickness direction of the porous substrate 12 (for example, so that most or almost all the pores inside the porous substrate 12 are filled by the LDH-like compound 14). A commercially available microporous polymer membrane can be preferably used as such a porous polymer substrate.

Production Method

The method for producing the hydroxide ion-conductive separator 10 is not specifically limited, and the hydroxide ion-conductive separator 10 can be produced by appropriately changing various conditions (particularly, the composition of LDH raw materials) in the already known methods (for example, see Patent Literatures 1 to 5) for producing a LDH-containing function layer and a composite material. For example, a LDH-like compound-containing function layer and a composite material (that is, a hydroxide ion-conductive separator) can be produced by (1) preparing a porous substrate, (2) applying a solution containing titania sol (or further containing yttrium sol and/or alumina sol) to the porous substrate, followed by drying, to form a titania-containing layer, (3) immersing the porous substrate in a raw material aqueous solution containing magnesium ions ($Mg^{2+}$) and urea (or further containing yttrium ions ($Y^{3+}$)), and (4) hydrothermally treating the porous substrate in the raw material aqueous solution, to form a LDH-like compound-containing function layer on the porous substrate and/or in the porous substrate. It is considered that the presence of urea in step (3) above generates ammonia in the solution through hydrolysis of urea, to increase the pH value, and coexisting metal ions form a hydroxide and/or an oxide, so that the LDH-like compound can be obtained.

In particular, in the case of producing a composite material (that is, a hydroxide ion-conductive separator) in which the porous substrate 12 is composed of a polymer material, and the LDH-like compound 14 is incorporated over the entire thickness direction of the porous substrate, the mixed sol solution is preferably applied to the substrate in step (2) above by a technique that allows the mixed sol solution to penetrate all or most of the inside of the substrate. This allows most or almost all the pores inside the porous substrate to be finally filled with the LDH-like compound. Preferable examples of the application technique include dip coating and filtration coating, particularly preferably dip coating. Adjusting the number of applications such as dip coating enables adjustment of the amount of the mixed sol solution to be applied. The substrate coated with the mixed sol solution by dip coating or the like may be dried and then subjected to steps (3) and (4) above.

When the porous substrate 12 is composed of a polymer material, a hydroxide ion-conductive separator obtained by the aforementioned method or the like is preferably pressed. This enables a hydroxide ion-conductive separator with further excellent denseness to be obtained. The pressing technique is not specifically limited and may be, for example, roll pressing, uniaxial compression press, CIP (cold isotropic pressing) or the like but is preferably roll pressing. This pressing is preferably performed under heating, since the porous polymer substrate is softened, so that the pores of the porous substrate can be sufficiently filled with the LDH-like compound. For sufficient softening, the heating temperature is preferably 60 to 200° C., for example, in the case of polypropylene or polyethylene. The pressing such as roll pressing within such a temperature range can considerably reduce residual pores in the hydroxide ion-conductive separator. As a result, the hydroxide ion-conductive separator can be extremely densified, and short circuits due to zinc dendrites can be thus suppressed further effectively. Appropriately adjusting the roll gap and the roll temperature in roll pressing enables the morphology of residual pores to be controlled, thereby enabling a hydroxide ion-conductive separator with desired denseness to be obtained.

Zinc Secondary Battery

The hydroxide ion-conductive separator of the present invention is preferably applied to zinc secondary batteries. Accordingly, a preferable aspect of the present invention provides a zinc secondary battery including the hydroxide ion-conductive separator. The zinc secondary battery typically includes a positive electrode, a negative electrode, and an electrolytic solution, wherein the positive electrode and the negative electrode are isolated from each other via the hydroxide ion-conductive separator. The zinc secondary battery of the present invention is not specifically limited, as long as it is a secondary battery using zinc as a negative electrode and an electrolytic solution (typically, an alkali metal hydroxide aqueous solution). Accordingly, it can be a nickel zinc secondary battery, a silver oxide zinc secondary battery, a manganese oxide zinc secondary battery, a zinc air secondary battery, or various other alkaline zinc secondary batteries. For example, it is preferable that the positive electrode contains nickel hydroxide and/or nickel oxyhydroxide, and thereby the zinc secondary battery serves as a nickel zinc secondary battery. Alternatively, the positive electrode may be an air electrode, and thereby the zinc secondary battery serves as a zinc air secondary battery.

Solid Alkaline Fuel Cell

The hydroxide ion-conductive separator of the present invention can be applied to solid alkaline fuel cells. That is, a solid alkaline fuel cell that can effectively suppress a decrease in electromotive force due to permeation of fuel (for example, crossover of methanol) to the air electrode side can be provided by using the hydroxide ion-conductive separator that is highly densified by filling the pores of the porous substrate with the LDH-like compound. This is because the permeation of fuel such as methanol through the hydroxide ion-conductive separator can be effectively suppressed, while the hydroxide ion conductivity of the hydroxide ion-conductive separator is exerted. Accordingly, another preferable aspect of the present invention provides a solid alkaline fuel cell comprising the hydroxide ion-conductive separator. The solid alkaline fuel cell according to this aspect typically comprises an air electrode to which oxygen is supplied, a fuel electrode to which a liquid fuel and/or a gas fuel is supplied, and the hydroxide ion-conductive separator interposed between the fuel electrode and the air electrode.

Other Batteries

The hydroxide ion-conductive separator of the present invention can be also used, for example, for a nickel hydrogen battery other than the nickel zinc battery and the solid alkaline fuel cell. In this case, the hydroxide ion-conductive separator functions to block a nitride shuttle (movement of nitric acid groups between the electrodes), which causes self-discharge of the battery. Further, the hydroxide ion-conductive separator of the present invention can be used also for a lithium battery (battery with a lithium metal serving as a negative electrode), a lithium ion battery (battery with carbon or the like serving as a negative electrode), or a lithium air battery.

EXAMPLES

The invention will be illustrated in more detail by the following examples. The method for evaluating the hydroxide ion-conductive separators produced in the following examples was as follows.

Evaluation 1: Observation of Surface Microstructure

The surface microstructure of the hydroxide ion-conductive separator was observed using a scanning electron microscope (SEM, JSM-6610LV, manufactured by JEOL Ltd.) at an acceleration voltage of 10 to 20 kV.

Evaluation 2: STEM Analysis of Layered Structure

The layered structure of the hydroxide ion-conductive separator was observed using a scanning transmission electron microscope (STEM) (product name: JEM-ARM200F, manufactured by JEOL Ltd.) at an acceleration voltage of 200 kV.

Evaluation 3: Elemental Analysis Evaluation (EDS)

A surface of the hydroxide ion-conductive separator was subjected to compositional analysis using an EDS analyzer (device name: X-act, manufactured by Oxford Instruments), to calculate the composition ratio (atomic ratio) Mg:Ti:Y:Al. This analysis was performed by 1) capturing an image at an acceleration voltage of 20 kV and a magnification of 5,000 times, 2) performing analysis at three points at intervals of about 5 µm in the point analysis mode, 3) repeating procedures 1) and 2) above once again, and 4) calculating an average of the six points in total.

Evaluation 4: X-Ray Diffraction Measurement

Using an X-ray diffractometer (RINT TTR III, manufactured by Rigaku Corporation), the crystalline phase of the hydroxide ion-conductive separator was measured under the measurement conditions of voltage: 50 kV, current value: 300 mA, and measurement range: 5 to 40°, to obtain an XRD profile. Further, the interlayer distance in the layered crystal structure was determined by Bragg's equation using 2θ corresponding to peaks derived from the LDH-like compound.

Evaluation 5: He Permeation Measurement

Figure 2A:
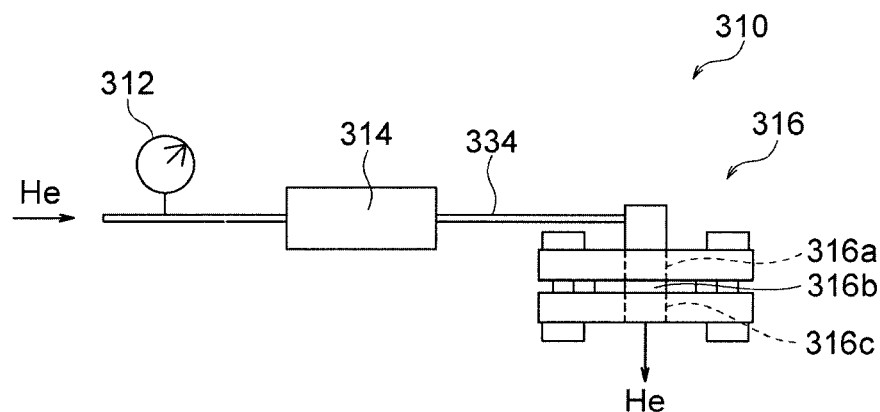
FIG. 2A is a conceptual diagram showing an example of a He permeability measurement system used in Examples 1 to 5.
Figure 2B:
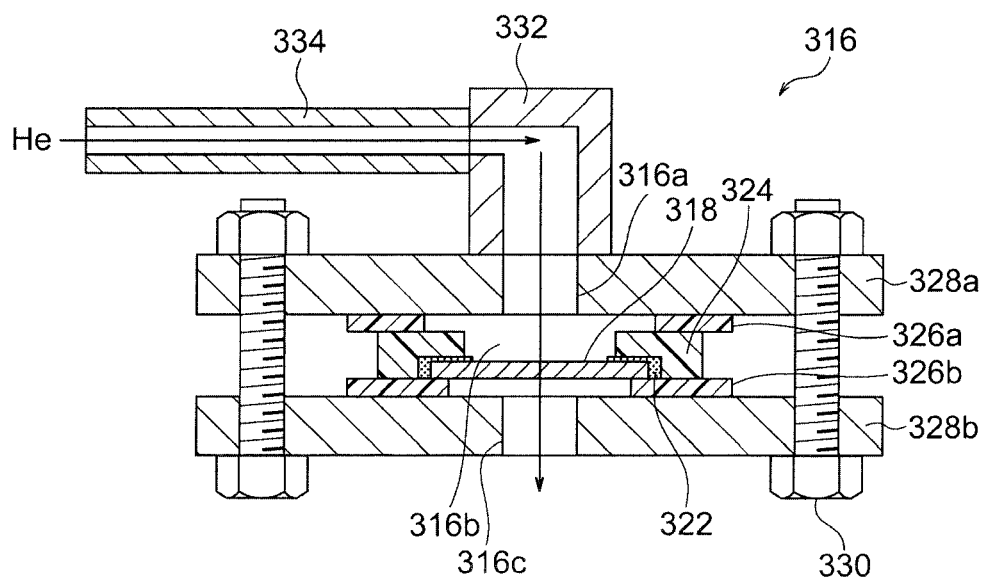
FIG. 2B is a schematic sectional view of a sample holder and the peripheral configuration thereof used for the measurement system shown in FIG. 2A.

In order to evaluate the denseness of the hydroxide ion-conductive separator in view of the He permeation, a He permeation test was performed, as follows. First, a He permeability measurement system 310 shown in FIG. 2A and FIG. 2B was constructed. The He permeability measurement system 310 was configured so that He gas was supplied to a sample holder 316 from a gas tank filled with He gas via a pressure gauge 312 and a flow meter 314 (digital flow meter), permeated from one surface to the other surface of a hydroxide ion-conductive separator 318 held by the sample holder 316, and discharged.

The sample holder 316 had a structure comprising a gas supply port 316a, a closed space 316b, and a gas discharge port 316c and was assembled, as follows. First, an adhesive 322 was applied along the outer circumference of the hydroxide ion-conductive separator 318, and the hydroxide ion-conductive separator 318 was attached to a jig 324 (made of ABS resin) having an opening at the center. Packings made of butyl rubber were arranged at the upper and lower ends of the jig 324 as sealing members 326a and 326b, and the outer sides of the sealing members 326a and 326b were sandwiched by support members 328a and 328b (made of PTFE) composed of flanges and having openings. Thus, the closed space 316b was partitioned by the hydroxide ion-conductive separator 318, the jig 324, the sealing member 326a, and the support member 328a. The support members 328a and 328b were firmly tightened to each other by a fastener 330 using screws so as not to allow leakage of He gas from the portion other than the gas discharge port 316c. A gas supply tube 334 was connected to the gas supply port 316a of the sample holder 316 thus assembled via a joint 332.

Then, He gas was supplied to the He permeability measurement system 310 via the gas supply tube 334, to permeate the hydroxide ion-conductive separator 318 held within the sample holder 316. At this time, the gas supply pressure and the flow rate were monitored with the pressure gauge 312 and the flow meter 314. After permeation of He gas for 1 to 30 minutes, the He permeability was calculated. The He permeability was calculated by the formula: F/(P×S) using the amount F of He gas permeation per unit time ($cm^3$/min), the differential pressure P (atm) applied to the hydroxide ion-conductive separator when the He gas permeates therethrough, and the area S (cm$^2$) of the membrane through which the He gas permeates. The amount F of He gas permeation (cm$^3$/min) was directly read from the flow meter 314. Further, a gauge pressure read from the pressure gauge 312 was used as the differential pressure P. The He gas was supplied so that the differential pressure P was within the range of 0.05 to 0.90 atm.

Evaluation 6: Measurement of Ion Conductivity

Figure 3:
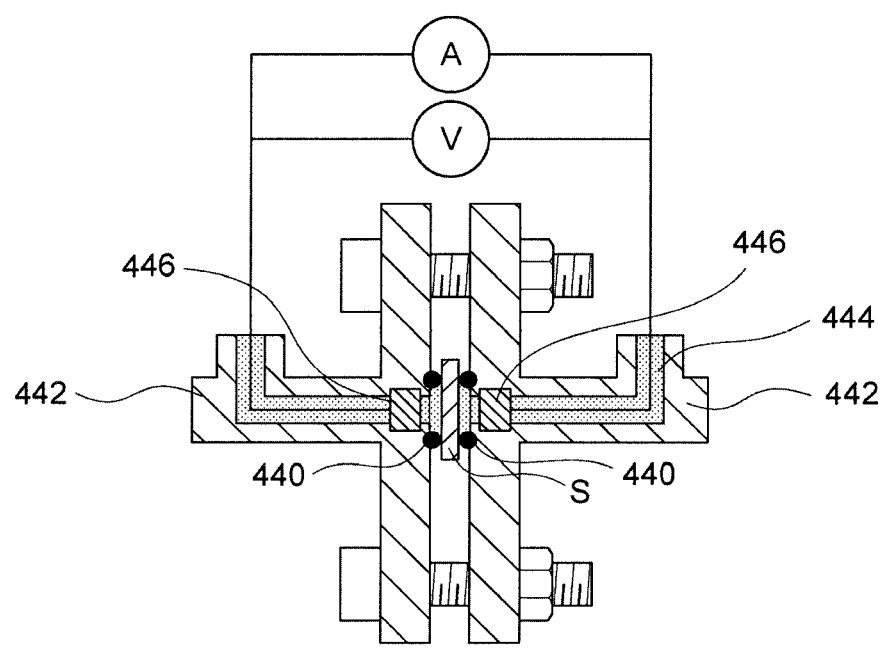
FIG. 3 is a schematic sectional view showing an electrochemical measurement system used in Examples 1 to 5.

The conductivity of the hydroxide ion-conductive separator in the electrolytic solution was measured using the electrochemical measurement system shown in FIG. 3, as follows. A hydroxide ion-conductive separator sample S was sandwiched by 1-mm thick silicone packings 440 from both sides, to be assembled in a PTFE flange-type cell 442 with an inner diameter of 6 mm. As electrodes 446, nickel wire meshes of #100 mesh were assembled in the cell 442 into a cylindrical shape with a diameter of 6 mm, so that the distance between the electrodes was 2.2 mm. The cell 442 was filled with a 5.4 M KOH aqueous solution as an electrolytic solution 444. Using electrochemical measurement systems (potentiostat/galvanostat-frequency response analyzers Type 1287A and Type 1255B, manufactured by Solartron Metrology), measurement was performed under the conditions of a frequency range of 1 MHz to 0.1 Hz and an applied voltage of 10 mV, and the real axis intercept was taken as the resistance of the hydroxide ion conductive separator sample S. The same measurement as above was carried out without the hydroxide ion-conductive separator sample S, to determine a blank resistance. The difference between the resistance of the hydroxide ion-conductive separator sample S and the blank resistance was taken as the resistance of the hydroxide ion-conductive separator. The conductivity was determined using the resistance of the hydroxide ion-conductive separator obtained, and the thickness and area of the hydroxide ion-conductive separator.

Evaluation 7: Evaluation of Alkali Resistance

A 5.4 M KOH aqueous solution containing zinc oxide at a concentration of 0.4 M was prepared. 0.5 mL of the KOH aqueous solution prepared and a hydroxide ion-conductive separator sample with a size of 2 cm square were put into a closed container made of Teflon®. Thereafter, it was maintained at 90° C. for one week (that is, 168 hours), and then the hydroxide ion-conductive separator sample was taken out of the closed container. The hydroxide ion-conductive separator sample taken out was dried overnight at room temperature. For the sample obtained, the He permeability was calculated in the same manner as in Evaluation 5, to determine whether or not the He permeability changed before and after the immersion in alkali.

Evaluation 8: Evaluation of Dendrite Resistance (Cycle Test)

In order to evaluate the effect of suppressing short circuits due to zinc dendrites (dendrite resistance) of the hydroxide ion-conductive separator, a cycle test was performed, as follows. First, each of the positive electrode (containing nickel hydroxide and/or nickel oxyhydroxide) and the negative electrode (containing zinc and/or zinc oxide) was wrapped with a non-woven fabric, and the current extraction terminal was welded thereto. The positive electrode and the negative electrode thus prepared were opposed to each other via the hydroxide ion-conductive separator and sandwiched between laminate films provided with current outlets, and three sides of the laminate films were heat-sealed. An electrolytic solution (a solution in which 0.4 M zinc oxide was dissolved in a 5.4 M KOH aqueous solution) was added to the cell container with the top open thus obtained, and the positive electrode and the negative electrode was sufficiently impregnated with the electrolytic solution by vacuuming or the like. Thereafter, the remaining one side of the laminate films was heat-sealed, to form a simple sealed cell. Using a charge/discharge device (TOSCAT3100, manufactured by TOYO SYSTEM CO., LTD.), the simple sealed cell was charged at 0.1 C and discharged at 0.2 C for chemical conversion. Thereafter, a 1-C charge/discharge cycle was conducted. While repeating the charge/discharge cycle under the same conditions, the voltage between the positive electrode and the negative electrode was monitored with a voltmeter, and the presence or absence of sudden voltage drops (specifically, voltage drops of 5 mV or more from the voltage that was just previously plotted) following short circuits due to zinc dendrites between the positive electrode and the negative electrode was examined and evaluated according to the following criteria.

No short circuits occurred: No sudden voltage drops as described above were observed during charging even after 300 cycles.

Short circuits occurred: Sudden voltage drops as described above were observed during charging in less than 300 cycles.

Example 1

(1) Preparation of Porous Polymer Substrate

A commercially available polyethylene microporous membrane with a porosity of 50%, a mean pore size of 0.1 μm, and a thickness of 20 μm was prepared as a porous polymer substrate and cut out into a size of 2.0 cm×2.0 cm.

(2) Titania Sol Coating on Porous Polymer Substrate

The substrate prepared by procedure (1) above was coated with a titanium oxide sol solution (M6, manufactured by Taki Chemical Co., Ltd.) by dip coating. Dip coating was performed by immersing the substrate in 100 ml of the sol solution and pulling it out perpendicularly, followed by drying at room temperature for 3 hours.

(3) Production of Raw Material Aqueous Solution

As raw materials, magnesium nitrate hexahydrate (Mg(NO$_3$)$_2$.6H$_2$O, manufactured by KANTO CHEMICAL CO., INC.) and urea ((NH$_2$)$_2$CO, manufactured by Sigma-Aldrich Corporation) were prepared. The magnesium nitrate hexahydrate was weighed to 0.015 mol/L and put into a beaker, and deionized water was added thereto so that the total amount was 75 ml. After stirring the solution obtained, urea weighed at a ratio urea/NO$_3^-$ (molar ratio) of 48 was added into the solution, followed by further stirring, to obtain a raw material aqueous solution.

(4) Membrane Formation by Hydrothermal Treatment

The raw material aqueous solution and the dip-coated substrate were enclosed together in a closed container made of Teflon® (autoclave container, content: 100 ml, with an outer stainless steel jacket). At this time, the substrate was lifted from the bottom of the closed container made of Teflon® and fixed and installed vertically so that the solution was in contact with both sides of the substrate. Thereafter, a LDH-like compound was formed on the surface and inside the substrate by applying hydrothermal treatment at a hydrothermal temperature of 120° C. for 24 hours. After a lapse of a predetermined time, the substrate was taken out of the closed container, washed with deionized water, and dried at 70° C. for 10 hours, to form a LDH-like compound in the pores of the porous substrate. Thus, a hydroxide ion-conductive separator was obtained.

(5) Densification by Roll Pressing

The hydroxide ion-conductive separator was sandwiched by a pair of PET films (Lumirror®, manufactured by Toray Industries, Inc., with a thickness of 40 μm) and roll-pressed at a roll rotation speed of 3 mm/s and a roller heating temperature of 70° C. with a roll gap of 70 μm, to obtain a hydroxide ion-conductive separator that was further densified.

(6) Evaluation Results

The hydroxide ion-conductive separator obtained was subjected to Evaluations 1 to 8. The results were as follows.

Figure 4A:
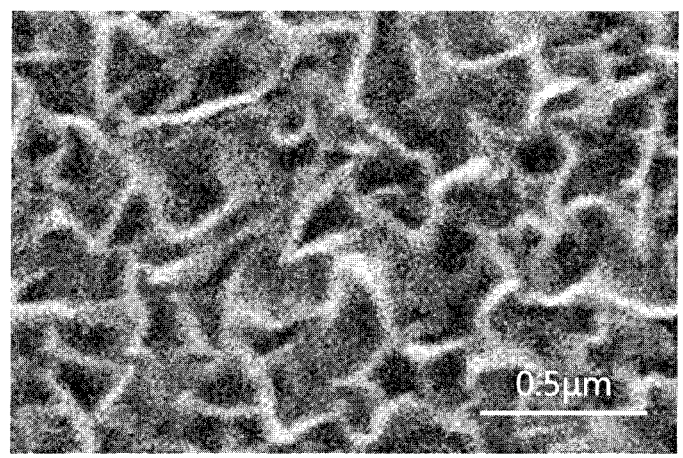
FIG. 4A is an SEM image of a surface of a hydroxide ion-conductive separator produced in Example 1.

Evaluation 1: The SEM image of the surface microstructure of the hydroxide ion-conductive separator obtained in Example 1 (before roll pressing) was as shown in FIG. 4A.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg and Ti, which were constituent elements of the LDH-like compound, were detected on the surface of the hydroxide ion-conductive separator. Further, the composition ratio (atomic ratio) of Mg and Ti on the surface of the hydroxide ion-conductive separator, which was calculated by EDS elemental analysis, was as shown in Table 1.

Figure 4B:
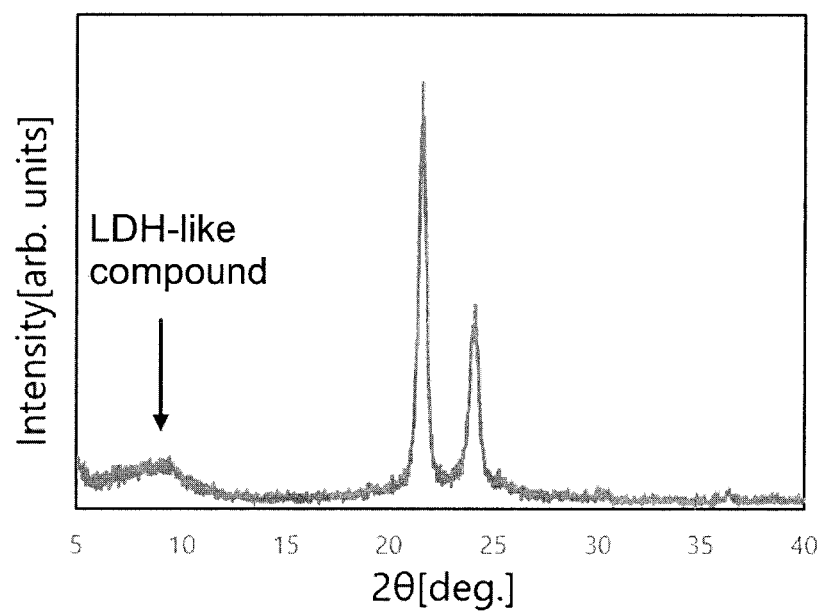
FIG. 4B is the result of X-ray diffraction of the hydroxide ion-conductive separator produced in Example 1.

Evaluation 4: FIG. 4B shows the XRD profile obtained in Example 1. In the XRD profile obtained, a peak was observed around $2\theta=9.4°$. Generally, the (003) peak position of LDH is observed at $2\theta=11$ to $12°$, and therefore it is considered that the peak is the (003) peak of LDH shifted to the low angle side. Therefore, the peak cannot be called that of LDH, but it suggests that it is a peak derived from a compound similar to LDH (that is, a LDH-like compound). Two peaks observed at $2\theta<26°<25$ in the XRD profile are peaks derived from polyethylene constituting the porous substrate. Further, the interlayer distance in the layered crystal structure of the LDH-like compound was 0.94 nm.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 1, it was confirmed that short circuits due to zinc dendrites did not occur even after 300 cycles, indicating that the dendrite resistance was excellent.

Example 2

A hydroxide ion-conductive separator was produced and evaluated in the same manner as in Example 1 except that the raw material aqueous solution was produced as follows in procedure (3) above, and the temperature for the hydrothermal treatment was changed to 90° C. in procedure (4) above.

(Production of Raw Material Aqueous Solution)

As raw materials, magnesium nitrate hexahydrate (Mg(NO$_3$)$_2$·6H$_2$O, manufactured by KANTO CHEMICAL CO., INC.) and urea ((NH$_2$)$_2$CO, manufactured by Sigma-Aldrich Corporation) were prepared. The magnesium nitrate hexahydrate was weighed to 0.03 mol/L and put into a beaker, and deionized water was added thereto so that the total amount was 75 ml. After stirring the solution obtained, urea weighed at a ratio urea/NO$_3$-(molar ratio) of 8 was added into the solution, followed by further stirring, to obtain a raw material aqueous solution.

Figure 5A:
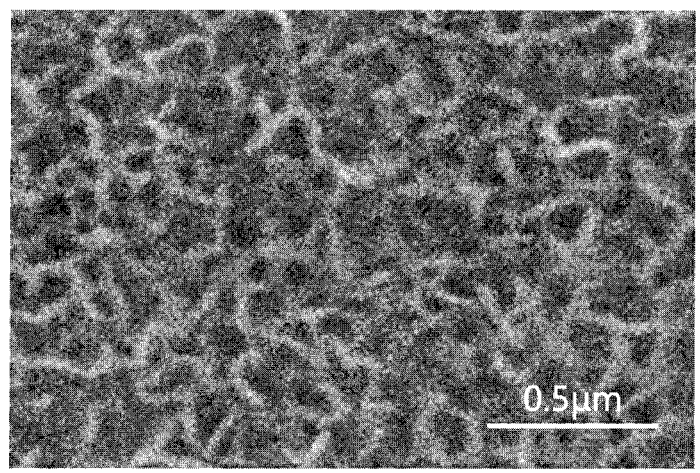
FIG. 5A is an SEM image of a surface of a hydroxide ion-conductive separator produced in Example 2.

Evaluation 1: The SEM image of the surface microstructure of the hydroxide ion-conductive separator obtained in Example 2 (before roll pressing) was as shown in FIG. 5A.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg and Ti, which were constituent elements of the LDH-like compound, were detected on the surface of the hydroxide ion-conductive separator. Further, the composition ratio (atomic ratio) of Mg and Ti on the surface of the hydroxide ion-conductive separator, which was calculated by EDS elemental analysis, was as shown in Table 1.

Figure 5B:
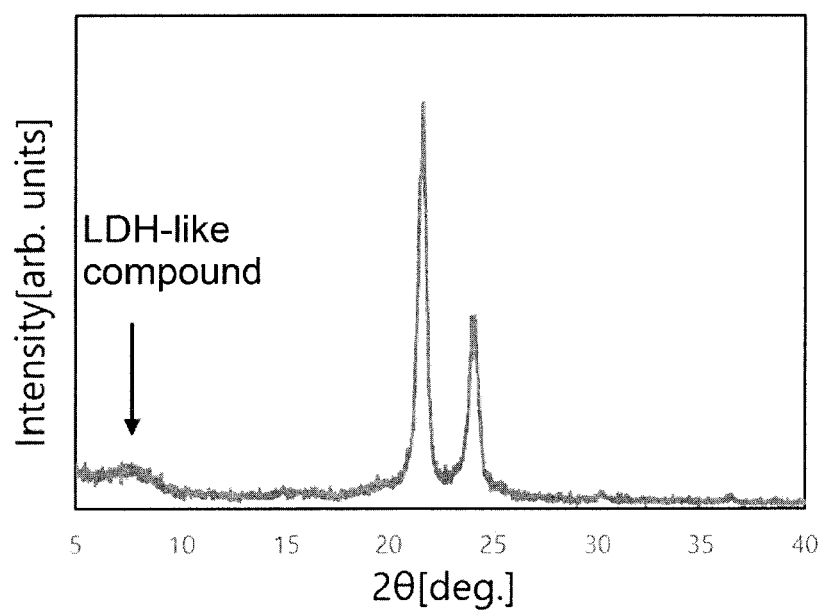
FIG. 5B is the result of X-ray diffraction of the hydroxide ion-conductive separator produced in Example 2.

Evaluation 4: FIG. 5B shows the XRD profile obtained in Example 2. In the XRD profile obtained, a peak was observed around $2\theta=7.2°$. Generally, the (003) peak position of LDH is observed at $2\theta=11$ to $12°$, and therefore it is considered that the peak is the (003) peak of LDH shifted to the low angle side. Therefore, the peak cannot be called that of LDH, but it suggests that it is a peak derived from a compound similar to LDH (that is, a LDH-like compound). Two peaks observed at $20<2\theta<25$ in the XRD profile are peaks derived from polyethylene constituting the porous substrate. Further, the interlayer distance in the layered crystal structure of the LDH-like compound was 1.2 nm.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 1, it was confirmed that short circuits due to zinc dendrites did not occur even after 300 cycles, indicating that the dendrite resistance was excellent.

Example 3

A hydroxide ion-conductive separator was produced and evaluated in the same manner as in Example 1 except that the porous polymer substrate was coated with titania and yttria sols as follows, instead of procedure (2) above.

(Titania-Yttria Sol Coating on Porous Polymer Substrate)

A titanium oxide sol solution (M6, manufactured by Taki Chemical Co., Ltd.) and a yttrium sol were mixed at a molar ratio Ti/Y of 4. The substrate prepared in procedure (1)

above was coated with the mixed solution obtained by dip coating. Dip coating was performed by immersing the substrate in 100 ml of the mixed solution and pulling it out perpendicularly, followed by drying at room temperature for 3 hours.

Figure 6A:
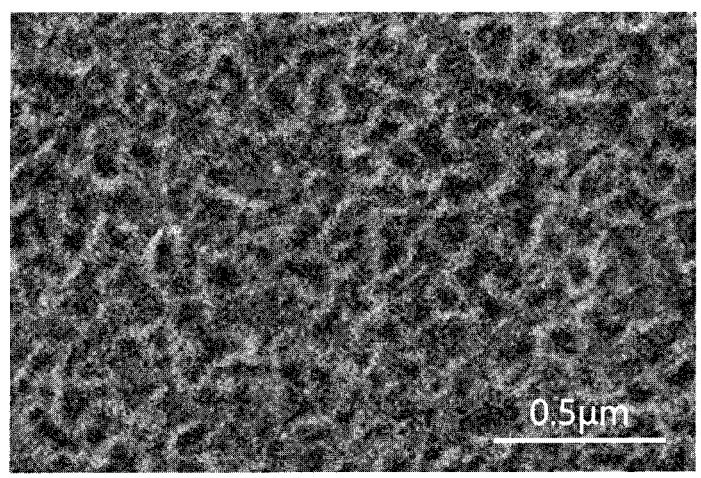
FIG. 6A is an SEM image of a surface of a hydroxide ion-conductive separator produced in Example 3.

Evaluation 1: The SEM image of the surface microstructure of the hydroxide ion-conductive separator obtained in Example 3 (before roll pressing) was as shown in FIG. 6A.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg, Ti, and Y, which were constituent elements of the LDH-like compound, were detected on the surface of the hydroxide ion-conductive separator. Further, the composition ratio (atomic ratio) of Mg, Ti, and Y on the surface of the hydroxide ion-conductive separator, which was calculated by EDS elemental analysis, was as shown in Table 1.

Figure 6B:
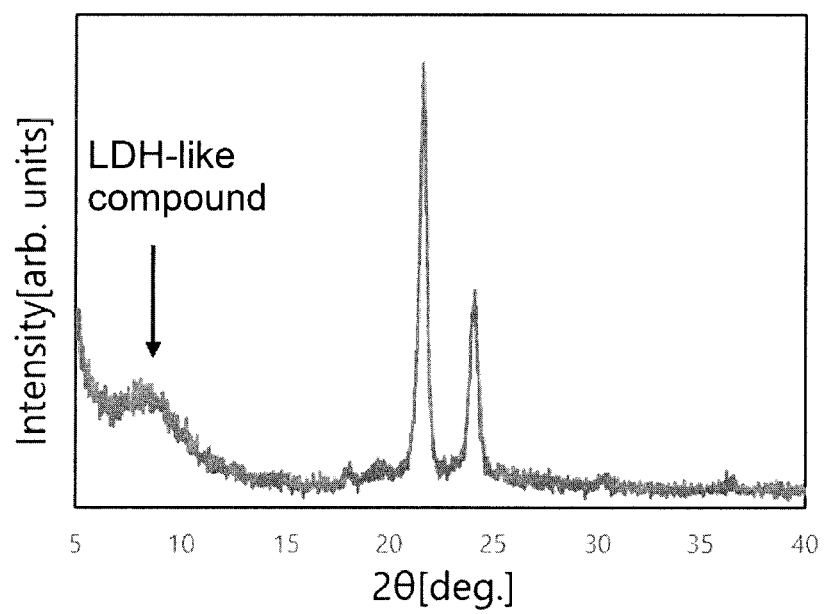
FIG. 6B is the result of X-ray diffraction of the hydroxide ion-conductive separator produced in Example 3.

Evaluation 4: FIG. 6B shows the XRD profile obtained in Example 3. In the XRD profile obtained, a peak was observed around 2θ=8.0°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, a LDH-like compound). Two peaks observed at 20<2θ°<25 in the XRD profile are peaks derived from polyethylene constituting the porous substrate. Further, the interlayer distance in the layered crystal structure of the LDH-like compound was 1.1 nm.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: The He permeability after immersion in alkali was less than 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 1, it was confirmed that short circuits due to zinc dendrites did not occur even after 300 cycles, indicating that the dendrite resistance was excellent.

Example 4

A hydroxide ion-conductive separator was produced and evaluated in the same manner as in Example 1 except that the porous polymer substrate was coated with titania, yttria, and alumina sols as follows, instead of procedure (2) above.
(Titania-Yttria-Alumina Sol Coating on Porous Polymer Substrate)

A titanium oxide sol solution (M6, manufactured by Taki Chemical Co., Ltd.), a yttrium sol, and an amorphous alumina solution (Al-ML15, manufactured by Taki Chemical Co., Ltd.) were mixed at a molar ratio Ti/(Y+Al) of 2 and a molar ratio Y/Al of 8. The substrate prepared in procedure (1) above was coated with the mixed solution by dip coating. Dip coating was performed by immersing the substrate in 100 ml of the mixed solution and pulling it out perpendicularly, followed by drying at room temperature for 3 hours.

Figure 7A:
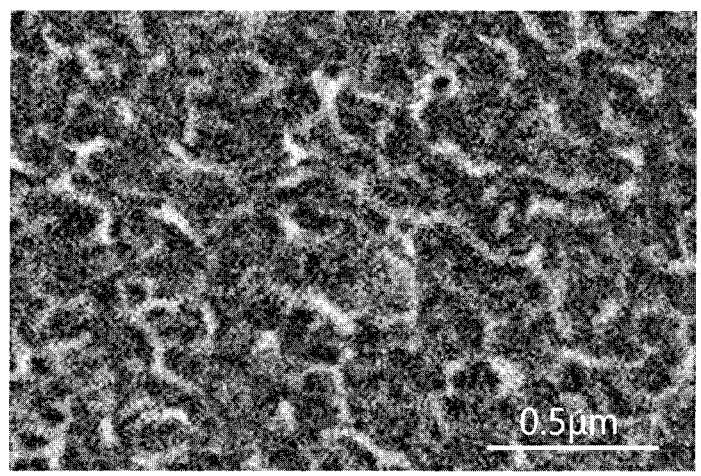
FIG. 7A is an SEM image of a surface of a hydroxide ion-conductive separator produced in Example 4.

Evaluation 1: The SEM image of the surface microstructure of the hydroxide ion-conductive separator obtained in Example 4 (before roll pressing) was as shown in FIG. 7A.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg, Al, Ti, and Y, which were constituent elements of the LDH-like compound, were detected on the surface of the hydroxide ion-conductive separator. Further, the composition ratio (atomic ratio) of Mg, Al, Ti, and Y on the surface of the hydroxide ion-conductive separator, which was calculated by EDS elemental analysis, was as shown in Table 1.

Figure 7B:
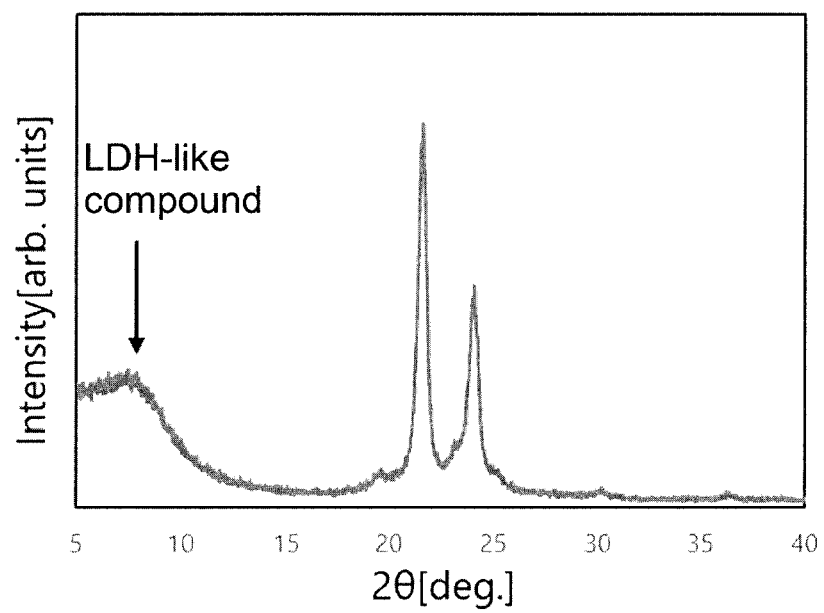
FIG. 7B is the result of X-ray diffraction of the hydroxide ion-conductive separator produced in Example 4.

Evaluation 4: FIG. 7B shows the XRD profile obtained in Example 4. In the XRD profile obtained, a peak was observed around 2θ=7.8°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, a LDH-like compound). Two peaks observed at 20<2θ°<25 in the XRD profile are peaks derived from polyethylene constituting the porous substrate. Further, the interlayer distance in the layered crystal structure of the LDH-like compound was 1.1 nm.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 1, it was confirmed that short circuits due to zinc dendrites did not occur even after 300 cycles, indicating that the dendrite resistance was excellent.

Example 5

A hydroxide ion-conductive separator was produced and evaluated in the same manner as in Example 1 except that the porous polymer substrate was coated with titania and yttria sols as follows, instead of procedure (2) above, and the raw material aqueous solution was produced as follows in procedure (3) above.
(Titania-Yttria Sol Coating on Porous Polymer Substrate)

A titanium oxide sol solution (M6, manufactured by Taki Chemical Co., Ltd.) and a yttrium sol were mixed at a molar ratio Ti/Y of 18. The substrate prepared in procedure (1) above was coated with the mixed solution obtained by dip coating. Dip coating was performed by immersing the substrate in 100 ml of the mixed solution and pulling it out perpendicularly, followed by drying at room temperature for 3 hours.

(Production of Raw Material Aqueous Solution)

As raw materials, magnesium nitrate hexahydrate (Mg(NO$_3$)$_2$·6H$_2$O, manufactured by KANTO CHEMICAL CO., INC.) and urea ((NH$_2$)$_2$CO, manufactured by Sigma-Aldrich Corporation) were prepared. The magnesium nitrate hexahydrate was weighed to 0.0075 mol/L and put into a beaker, and deionized water was added thereto so that the total amount was 75 ml. Then, the solution obtained was stirred. Urea weighed at a ratio urea/NO$_3^-$ (molar ratio)=96 was added into the solution, followed by further stirring, to obtain a raw material aqueous solution.

Figure 8A:
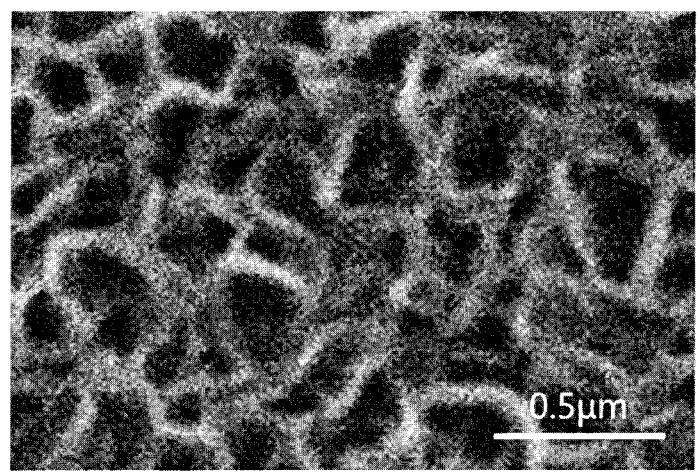
FIG. 8A is an SEM image of a surface of a hydroxide ion-conductive separator produced in Example 5.

Evaluation 1: The SEM image of the surface microstructure of the hydroxide ion-conductive separator obtained in Example 5 (before roll pressing) was as shown in FIG. 8A.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg, Ti, and Y, which were constituent elements of the LDH-like compound, were detected on the surface of the hydroxide ion-conductive separator. Further, the composition ratio (atomic ratio) of Mg, Ti, and Y on the surface of the hydroxide ion-conductive separator, which was calculated by EDS elemental analysis, was as shown in Table 1.

Figure 8B:
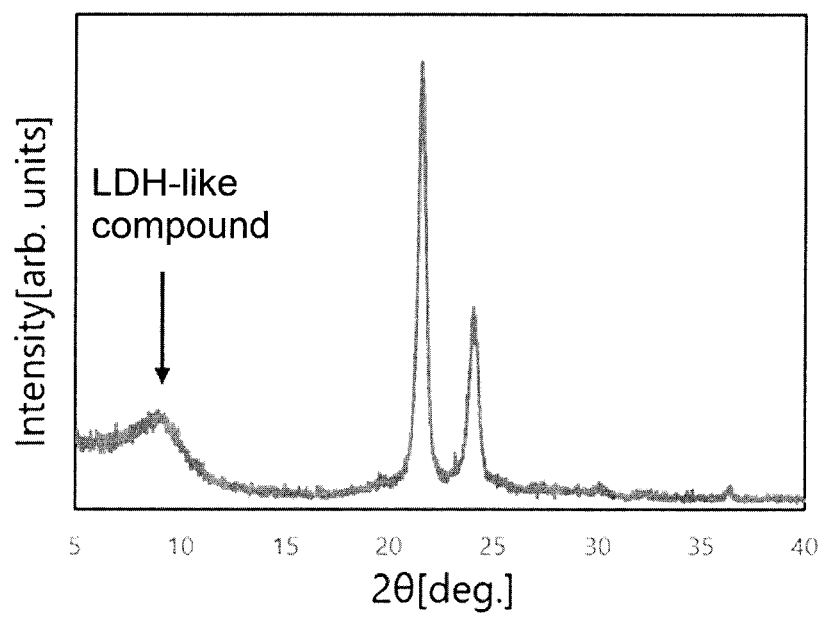
FIG. 8B is the result of X-ray diffraction of the hydroxide ion-conductive separator produced in Example 5.

Evaluation 4: FIG. 8B shows the XRD profile obtained in Example 5. In the XRD profile obtained, a peak was observed around 2θ=8.9°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, a LDH-like compound). Two peaks observed at 20<2θ°<25 in the XRD profile are peaks derived from polyethylene constituting the porous substrate. Further, the interlayer distance in the layered crystal structure of the LDH-like compound was 0.99 nm.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 1, it was confirmed that short circuits due to zinc dendrites did not occur even after 300 cycles, indicating that the dendrite resistance was excellent.

Example 6

A hydroxide ion-conductive separator was produced and evaluated in the same manner as in Example 1 except that the porous polymer substrate was coated with titania and alumina sols as follows, instead of procedure (2) above, and the raw material aqueous solution was produced as follows in procedure (3) above.

(Titania-Alumina Sol Coating on Porous Polymer Substrate)

A titanium oxide sol solution (M6, manufactured by Taki Chemical Co., Ltd.) and an amorphous alumina solution (Al-ML15, manufactured by Taki Chemical Co., Ltd.) were mixed at a molar ratio Ti/Al of 18. The substrate prepared in procedure (1) above was coated with the mixed solution by dip coating. Dip coating was performed by immersing the substrate in 100 ml of the mixed solution and pulling it out perpendicularly, followed by drying at room temperature for 3 hours.

(Production of Raw Material Aqueous Solution)

As raw materials, magnesium nitrate hexahydrate (Mg(NO$_3$)$_2$·6H$_2$O, manufactured by KANTO CHEMICAL CO., INC.), yttrium nitrate n hydrate (Y(NO$_3$)$_3$·nH$_2$O, manufactured by FUJIFILM Wako Pure Chemical Corporation), and urea ((NH$_2$)$_2$CO, manufactured by Sigma-Aldrich Corporation) were prepared. The magnesium nitrate hexahydrate was weighed to 0.0015 mol/L and put into a beaker. Further, the yttrium nitrate n hydrate was weighed to 0.0075 mol/L and put into the beaker, and deionized water was added thereto so that the total amount was 75 ml. Then, the solution obtained was stirred. Urea weighed at a ratio urea/NO$_3^-$ (molar ratio) of 9.8 was added into the solution, followed by further stirring, to obtain a raw material aqueous solution.

Figure 9A:
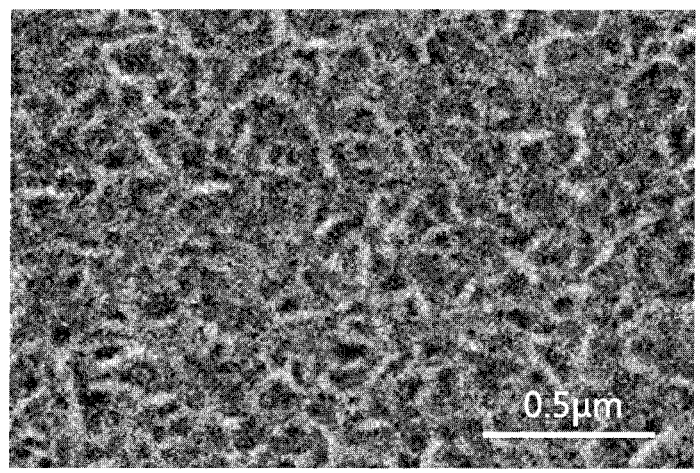
FIG. 9A is an SEM image of a surface of a hydroxide ion-conductive separator produced in Example 6.

Evaluation 1: The SEM image of the surface microstructure of the hydroxide ion-conductive separator obtained in Example 6 (before roll pressing) was as shown in FIG. 9A.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg, Al, Ti, and Y, which were constituent elements of the LDH-like compound, were detected on the surface of the hydroxide ion-conductive separator. Further, the composition ratio (atomic ratio) of Mg, Al, Ti, and Y on the surface of the hydroxide ion-conductive separator, which was calculated by EDS elemental analysis, was as shown in Table 1.

Figure 9B:
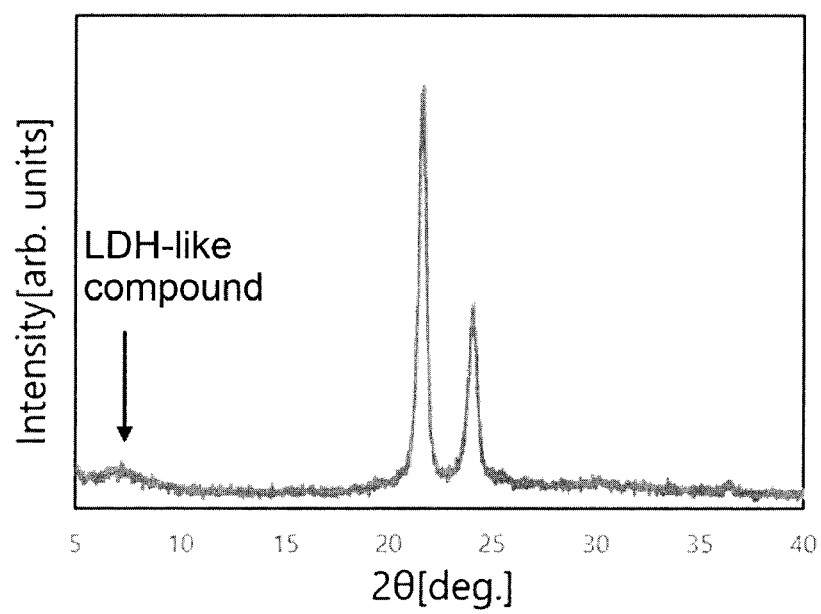
FIG. 9B is the result of X-ray diffraction of the hydroxide ion-conductive separator produced in Example 6.

Evaluation 4: FIG. 9B shows the XRD profile obtained in Example 6. In the XRD profile obtained, a peak was observed around 2θ=7.2°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, a LDH-like compound). Two peaks observed at 20<2θ°<25 in the XRD profile are peaks derived from polyethylene constituting the porous substrate. Further, the interlayer distance in the layered crystal structure of the LDH-like compound was 1.2 nm.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

19

Evaluation 8: As shown in Table 1, it was confirmed that short circuits due to zinc dendrites did not occur even after 300 cycles, indicating that the dendrite resistance was excellent.

Example 7

A hydroxide ion-conductive separator was produced and evaluated in the same manner as in Example 6 except that the raw material aqueous solution was produced as follows in procedure (3) above.
(Production of Raw Material Aqueous Solution)

As raw materials, magnesium nitrate hexahydrate (Mg(NO$_3$)$_2$·6H$_2$O, manufactured by KANTO CHEMICAL CO., INC.), yttrium nitrate n hydrate (Y(NO$_3$)$_3$·nH$_2$O, manufactured by FUJIFILM Wako Pure Chemical Corporation), and urea ((NH$_2$)$_2$CO, manufactured by Sigma-Aldrich Corporation) were prepared. The magnesium nitrate hexahydrate was weighed to 0.0075 mol/L and put into a beaker. Further, the yttrium nitrate n hydrate was weighed to 0.0075 mol/L and put into the beaker, and deionized water was added thereto so that the total amount was 75 ml. Then, the solution obtained was stirred. Urea weighed at a ratio urea/NO$_3^-$ (molar ratio) of 25.6 was added into the solution, followed by further stirring, to obtain a raw material aqueous solution.

Figure 10:
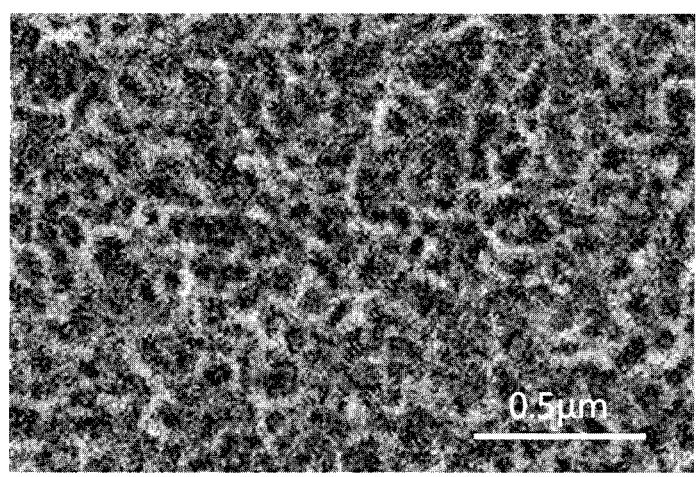
FIG. 10 is an SEM image of a surface of a hydroxide ion-conductive separator produced in Example 7.

Evaluation 1: The SEM image of the surface microstructure of the hydroxide ion-conductive separator obtained in Example 7 (before roll pressing) was as shown in FIG. 10.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg, Al, Ti, and Y, which were constituent elements of the LDH-like compound, were detected on the surface of the hydroxide ion-conductive separator. Further, the composition ratio (atomic ratio) of Mg, Al, Ti, and Y on the surface of the hydroxide ion-conductive separator, which was calculated by EDS elemental analysis, was as shown in Table 1.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

20

Evaluation 8: As shown in Table 1, it was confirmed that short circuits due to zinc dendrites did not occur even after 300 cycles, indicating that the dendrite resistance was excellent.

Example 8 (Comparison)

A hydroxide ion-conductive separator was produced and evaluated in the same manner as in Example 1 except that alumina sol coating was performed as follows, instead of procedure (2) above.
(Alumina Sol Coating on Porous Polymer Substrate)

The substrate prepared in procedure (1) above was coated with an amorphous alumina sol (Al-ML15, manufactured by Taki Chemical Co., Ltd.) by dip coating. Dip coating was performed by immersing the substrate in 100 ml of the amorphous alumina sol and pulling it out perpendicularly, followed by drying at room temperature for 3 hours.

Figure 11A:
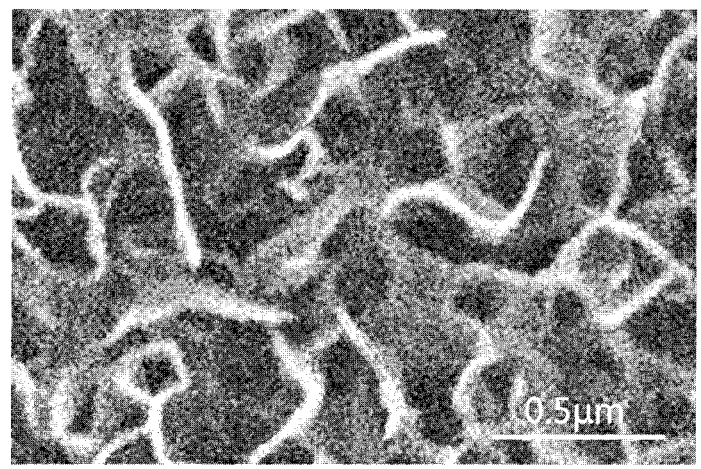
FIG. 11A is an SEM image of a surface of a hydroxide ion-conductive separator produced in Example 8 (comparison).

Evaluation 1: The SEM image of the surface microstructure of the hydroxide ion-conductive separator obtained in Example 8 (before roll pressing) was as shown in FIG. 11A.

Evaluation 2: From the result that layered plaids could be observed, it was confirmed that the portion of the hydroxide ion-conductive separator other than the porous substrate was a compound with a layered crystal structure.

Evaluation 3: As a result of EDS elemental analysis, Mg and Al, which were constituent elements of LDH, were detected on the surface of the hydroxide ion-conductive separator. Further, the composition ratio (atomic ratio) of Mg and Al on the surface of the hydroxide ion-conductive separator, which was calculated by EDS elemental analysis, was as shown in Table 1.

Figure 11B:
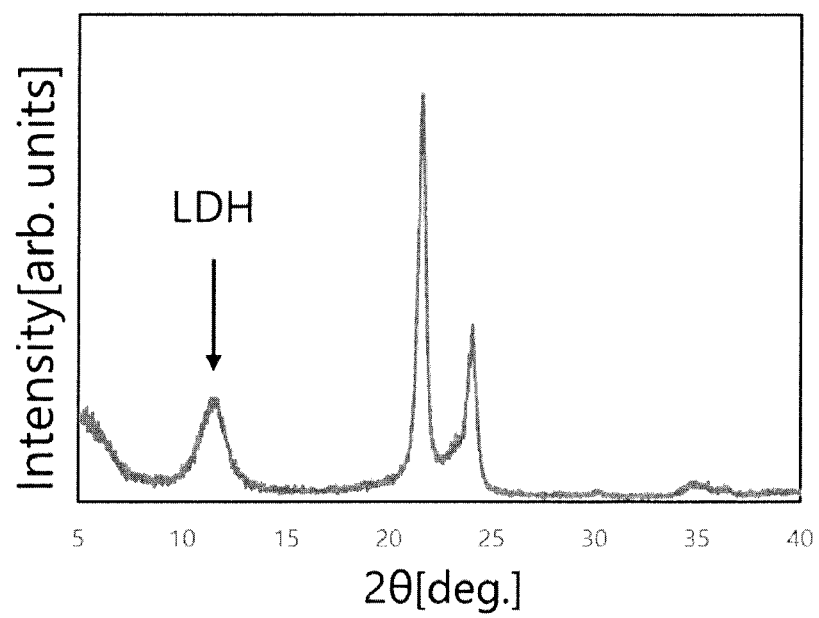
FIG. 11B is the result of X-ray diffraction of the hydroxide ion-conductive separator produced in Example 8 (comparison).

Evaluation 4: FIG. 11B shows the XRD profile obtained in Example 8. From a peak around $2\theta=11.5°$ in the XRD profile obtained, the hydroxide ion-conductive separator obtained in Example 8 was identified to be a LDH (hydrotalcite compound). This identification was performed using the diffraction peak of the LDH (hydrotalcite compound) described in JCPDS card NO. 35-0964. Two peaks observed at $20<2\theta°<25$ in the XRD profile are peaks derived from polyethylene constituting the porous substrate.

Evaluation 5: As shown in Table 1, it was confirmed that the He permeability was 0.0 cm/min·atm, indicating that the denseness was extremely high.

Evaluation 6: As shown in Table 1, it was confirmed that the ion conductivity was high.

Evaluation 7: As a result of the immersion in alkali at a high temperature of 90° C. for one week, the He permeability that was 0.0 cm/min·atm in Evaluation 5 was over 10 cm/min·atm, revealing that the alkali resistance was poor.

Evaluation 8: As shown in Table 1, short circuits due to zinc dendrites occurred in less than 300 cycles, revealing that the dendrite resistance was poor.

TABLE 1

| | | | | | Alkali resistance | |
| | LDH-like compound or composition of LDH | Composition ratio (Atomic ratio) | He permeation (cm/min · atm) | Ion conductivity (mS/cm) | Presence or absence of change in He permeability | Dendrite resistance Presence or absence of short circuits |
|---|---|---|---|---|---|---|
| Example 1 | Mg—Ti-LDH-like | Mg:Ti = 6:94 | 0.0 | 3.0 | Absent | Absent |
| Example 2 | Mg—Ti-LDH-like | Mg:Ti = 20:80 | 0.0 | 2.0 | Absent | Absent |
| Example 3 | Mg—(Ti,Y)-LDH-like | Mg:Ti:Y = 5:83:12 | 0.0 | 3.0 | Absent | Absent |

TABLE 1-continued

| | LDH-like compound or composition of LDH | Composition ratio (Atomic ratio) | Evaluation of hydroxide ion-conductive separator | | | |
|---|---|---|---|---|---|---|
| | | | He permeation (cm/min · atm) | Ion conductivity (mS/cm) | Alkali resistance Presence or absence of change in He permeability | Dendrite resistance Presence or absence of short circuits |
| Example 4 | Mg—(Ti,Y,Al)-LDH-like | Mg:Al:Ti:Y = 7:3:79:12 | 0.0 | 3.1 | Absent | Absent |
| Example 5 | Mg—(Ti,Y)- LDH-like | Mg:Ti:Y = 6:88:6 | 0.0 | 3.0 | Absent | Absent |
| Example 6 | Mg—(Ti,Y,Al)-LDH-like | Mg:Al:Ti:Y = 5:2:67:25 | 0.0 | 3.1 | Absent | Absent |
| Example 7 | Mg—(Ti,Y,Al)-LDH-like | Mg:Al:Ti:Y = 15:1:47:37 | 0.0 | 2.9 | Absent | Absent |
| Example 8* | Mg—Al-LDH | Mg:Al = 67:32 | 0.0 | 2.7 | Present | Present |

Symbol* represents a comparative example.

What is claimed is:

1. A hydroxide ion-conductive separator comprising:
a porous substrate; and
a layered double hydroxide (LDH)-like compound filling pores of the porous substrate, wherein the LDH-like compound is a hydroxide and/or an oxide with a layered crystal structure, containing: Mg; and one or more elements, which include at least Ti, selected from the group consisting of Ti, Y, and Al.

2. The hydroxide ion-conductive separator according to claim 1, wherein an atomic ratio Mg/(Mg+Ti+Y+Al) in the LDH-like compound, as determined by energy dispersive X-ray spectroscopy (EDS), is 0.03 to 0.25.

3. The hydroxide ion-conductive separator according to claim 1, wherein an atomic ratio Ti/(Mg+Ti+Y+Al) in the LDH-like compound, as determined by energy dispersive X-ray spectroscopy (EDS), is 0.40 to 0.97.

4. The hydroxide ion-conductive separator according to claim 1, wherein an atomic ratio Y/(Mg+Ti+Y+Al) in the LDH-like compound, as determined by energy dispersive X-ray spectroscopy (EDS), is 0 to 0.45.

5. The hydroxide ion-conductive separator according to claim 1, wherein an atomic ratio Al/(Mg+Ti+Y+Al) in the LDH-like compound, as determined by energy dispersive X-ray spectroscopy (EDS), is 0 to 0.05.

6. The hydroxide ion-conductive separator according to claim 1, wherein when a surface of the hydroxide ion-conductive separator is subjected to X-ray diffraction, a peak derived from the LDH-like compound is detected in the range of $5°≤2θ≤10°$.

7. The hydroxide ion-conductive separator according to claim 1, wherein the porous substrate is composed of a polymer material.

8. The hydroxide ion-conductive separator according to claim 7, wherein the polymer material is selected from the group consisting of polystyrene, polyether sulfone, polypropylene, epoxy resins, polyphenylene sulfide, fluorocarbon polymers, cellulose, nylons, and polyethylene.

9. The hydroxide ion-conductive separator according to claim 1, wherein the hydroxide ion-conductive separator has an ion conductivity of 2.0 mS/cm or more.

10. The hydroxide ion-conductive separator according to claim 1, wherein the hydroxide ion-conductive separator has a He permeability per unit area of 10 cm/min·atm or less.

11. The hydroxide ion-conductive separator according to claim 10, wherein, even when immersed in a 5.4 M KOH aqueous solution containing zinc oxide at a concentration of 0.4 M at 90° C. for one week, the hydroxide ion-conductive separator has a He permeability per unit area of 10 cm/min·atm or less.

12. The hydroxide ion-conductive separator according to claim 1, wherein an interlayer distance in the layered crystal structure constituting the LDH-like compound is 0.883 to 1.8 nm.

13. The hydroxide ion-conductive separator according to claim 1, wherein the LDH-like compound further comprises Zn and/or K.

14. A zinc secondary battery comprising the hydroxide ion-conductive separator according to claim 1.

15. A solid alkaline fuel cell comprising the hydroxide ion-conductive separator according to claim 1.

* * * * *